No. 707,582. Patented Aug. 26, 1902.
W. I. GREGORY.
VEHICLE TIRE.
(Application filed Jan. 18, 1901.)

(No Model.)

Witnesses:
Wm H. Barker.
A. B. Jenkins

Inventor:
Walter I. Gregory
by Chas. L. Burdett
Attorney

THE NORRIS PETERS CO., PHOTO-LITHO., WASHINGTON, D. C.

UNITED STATES PATENT OFFICE.

WALTER I. GREGORY, OF SPRINGFIELD, MASSACHUSETTS.

VEHICLE-TIRE.

SPECIFICATION forming part of Letters Patent No. 707,582, dated August 26, 1902.

Application filed January 18, 1901. Serial No. 43,687. (No model.)

*To all whom it may concern:*

Be it known that I, WALTER I. GREGORY, a citizen of the United States, and a resident of Springfield, in the county of Hampden and State of Massachusetts, have invented certain new and useful Improvements in Vehicle-Tires, of which the following is a specification.

My invention relates to that class of devices employed in a vehicle-wheel for providing a wearing-surface, and more especially to the means for securing such devices in place on the rim or felly of the wheel; and the object of my invention is to provide a device of this class that shall securely hold the tire in position, that shall present a sightly appearance, and one that shall prolong or preserve the wearing qualities of the tire.

A device in which my invention may be carried out is shown in the accompanying drawings, in which—

Figure 1:
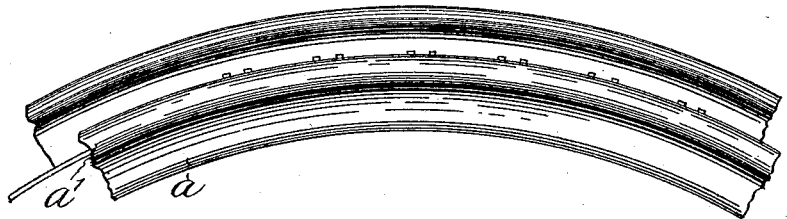
Figure 2:
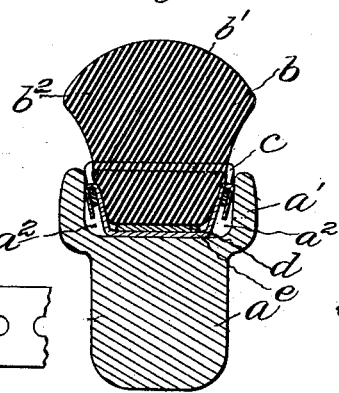
Figure 9:
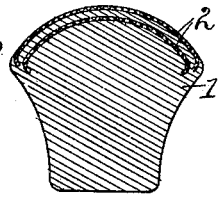
Figure 6:
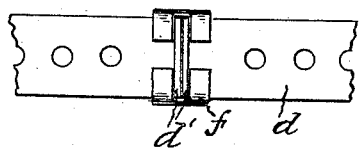
Figure 7:
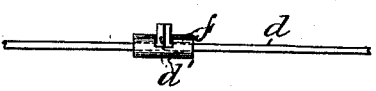
Figure 3:
Figure 3:
Figure 4:
Figure 4:
Figure 5:
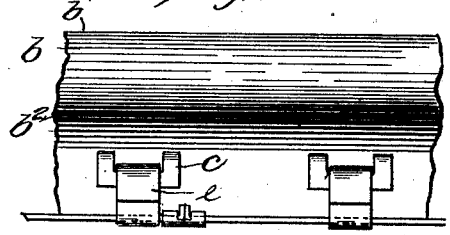
Figure 8:

Figure 1 is a view in side elevation of a portion of the rim of a wheel, showing means for attaching the tire by my improved means. Fig. 2 is a detail view, on enlarged scale, in cross-section through the rim and tire. Fig. 3 is a plan and end view of the attaching-loop. Fig. 4 shows a plan and end view of the attaching-clip. Fig. 5 is a detail view, on enlarged scale, showing a portion of the tire and the attaching means. Fig. 6 is a detail plan view of the meeting ends of the ribbon, showing the means of connection. Fig. 7 is a detail side view of the same. Fig. 8 shows an edge view of the attaching-clip. Fig. 9 is a detail view in section of a modified form of tire.

In the accompanying drawings the letter $a$ denotes the rim or felly of a wheel having on each side peripheral flanges $a'$, forming a groove $a^2$. These flanges may be formed integral with the rim, as herein shown, or may be formed in any other suitable manner, it being of course understood that the rim is suitably formed for the reception of spokes or connection with the hub, these elements being omitted from the drawings, for the reason that they are sufficiently well understood by any skilled in the art to which the invention refers. The tire $b$ is located in the groove $a^2$, and the means for securing this tire in the groove forms a special feature of my invention, especially when this tire is constructed of rubber, as being the most available and practicable material entering into the manufacture of cushion or like tires. This tire is preferably constructed with a comparatively wide tread $b'$ and a narrow back portion adapted to be located in the groove $a^2$ in the wheel-rim. In this narrow portion and at suitable intervals along the length of the tire are arranged attaching-loops $c$, preferably secured in place by being molded into the tire and extending or projecting from the side of the tire. These loops are bent downward, the bend being preferably located close to the tire, and the loops are located in such position in the tire that they will lie within the groove $a^2$ in the wheel-rim. A ribbon $d$, preferably of metal, is employed for holding the tire in position in the groove $a^2$, the tire being secured to the said ribbon, as by means of attaching-clips $e$. These clips are passed underneath the ribbon and each end of a clip is passed through an opening in an attaching-loop $c$, care being taken in this manner of securing the tire to the ribbon that the rubber composing the tire shall be compressed but little, if any, in this operation. When the tire has thus been secured to the ribbon, the latter is placed in the groove $a^2$ in the rim and the ends of the ribbon drawn together and securely fastened. A preferred form of fastening means for the ribbon ends consists in placing on the upturned ends $d'$, as shown in Figs. 5, 6, and 7 of the drawings, a socket-piece $f$, which securely holds the ends of the ribbon against separation.

In assembling the parts the tire $b$ is first securely fastened to the ribbon $d$, and the latter is then placed in the groove in the rim of the wheel and the ends drawn together in any well-known manner and fastened, as above described. The tread of the tire is constructed quite broad as compared with the base, to which it tapers gradually, thus providing overhanging parts $b^2$ on the sides of the tire. A tire constructed after this form is less liable to be cut than tires of the prior art, for the reason that a great portion of the tread of the tire has nothing beneath to sustain it when in contact with a sharp obstacle. The tire does not entirely fill the groove in the rim, and is thus allowed a chance to expand at this point when sustaining a load. This manner of first securing the tire to a ribbon permits the tire to be affixed to the rim of the wheel with the rubber nearly in its normal state—that is, the rubber is not compressed so that any portion of it is in what is known as a "dead" state. The holding device being applied to the tire at a considerable distance from the base and there being extra space between the tire and the walls of the groove in the wheel-rim, the tire has the greatest amount of "life," which permits the greatest amount of spring action depthwise and sidewise of the tire, which is a prominent factor in preventing tearing of the rubber composing the tire. The fastening means are protected by the walls of the groove, and the tire cannot creep on its immediate support, for if there is a tendency to longitudinal movement on the rim of the wheel the ribbon will so move with the tire, and thus prevent the latter being worn from rubbing contact with any surface. The loops and clips also prevent any cutting or wearing of the tire against the side of the groove in any creeping movement that may occur.

In Fig. 9 the tread of the tire is provided with a tough practically non-elastic material, preferably a woven fabric, as canvas. This may be applied to the tire in the process of vulcanizing, and two of these layers 2 may be vulcanized into the substance of the tire.

What I claim as my invention, and desire to secure by Letters Patent, is—

1. In a vehicle-wheel, in combination with the rim, a ribbon encircling the rim and secured thereto, a tire, ribbon-attaching loops and clips adapted to secure the tire to the ribbon.

2. In a vehicle-wheel, in combination with the rim having a peripheral groove, a ribbon adapted to be secured in said groove, a tire, and attaching loops and clips securing the tire to the ribbon.

3. In a vehicle-wheel, in combination with the rim having a peripheral groove, a ribbon arranged to be secured within the groove, attaching-clips secured by the ribbon, the tire, and attaching-loops secured to the tire and adapted to be engaged with said clips.

4. In a vehicle-wheel, in combination with the rim having a peripheral groove, a ribbon having each of its meeting ends bent at an angle to the plane of the ribbon, a socket-piece consisting of a flat piece of metal embracing the body part of the ribbon and having a slot adapted to receive each of said bent ends of the ribbon, a tire, and means for securing the tire to the ribbon.

5. In a wheel, in combination with the rim having a peripheral groove, a ribbon having its ends bent to receive a socket-piece, the socket-piece adapted to secure the ribbon within the groove, a tire, attaching-loops secured to the tire, and attaching-clips passing underneath the ribbon and in engagement with the attaching-loops.

6. In a vehicle-wheel, in combination with the rim having a peripheral groove, a ribbon adapted to be secured within said groove, a tire, attaching-loops secured to the tire, and clips passing underneath the ribbon and engaging with the loops at a point within the groove in the rim.

7. In a vehicle-wheel, in combination with the rim having a peripheral groove, a ribbon adapted to be secured within said groove, a tire, attaching-loops embedded within the tire and projecting on each side, and attaching-clips passing underneath the ribbon and in engagement with the ends of said loops.

8. In a vehicle-wheel, in combination with the rim having a peripheral groove, a tire having a broad end tread overlying the edges of the groove and a base of a width less than the width of the groove, a ribbon adapted to be secured within the groove and underneath the tire, and means for securing the tire to said ribbon.

9. In a vehicle-wheel, in combination with the rim having a peripheral groove, a ribbon adapted to be secured within said groove, a tire of elastic material having one or more layers of textile fabric embedded in and near the tread portion of the tire, and clips and loops adapted to secure the ribbon and tire together.

10. In a vehicle-wheel, in combination with the rim having a peripheral groove, a ribbon having each of its meeting ends bent at an angle to the plane of the ribbon, a socket-piece consisting of a flat piece of metal having its ends bent over opposite edges of the ribbon and containing slots each of which receives the two bent ends of said ribbon, a tire, and means for securing the tire to the ribbon.

WALTER I. GREGORY.

Witnesses:
ARTHUR B. JENKINS,
ERMA P. COFFRIN.